(12) United States Patent
Ueda et al.

(10) Patent No.: US 9,477,133 B2
(45) Date of Patent: Oct. 25, 2016

(54) DISPLAYING MEDIUM AND DISPLAYING APPARATUS

(71) Applicant: Sony Corporation, Tokyo (JP)

(72) Inventors: Kazuhiko Ueda, Kanagawa (JP); Keisuke Hashimoto, Kanagawa (JP); Ken Kikuchi, Tokyo (JP)

(73) Assignee: Sony Corporation (JP)

( * ) Notice: Subject to any disclaimer, the term of this patent is extended or adjusted under 35 U.S.C. 154(b) by 34 days.

(21) Appl. No.: 14/334,765

(22) Filed: Jul. 18, 2014

(65) Prior Publication Data

US 2015/0029418 A1    Jan. 29, 2015

(30) Foreign Application Priority Data

Jul. 26, 2013 (JP) .................................. 2013-155857

(51) Int. Cl.
| | | |
|---|---|---|
| G02F 1/1333 | (2006.01) | |
| G02F 1/167 | (2006.01) | |
| G09G 3/19 | (2006.01) | |
| G09G 3/36 | (2006.01) | |

(52) U.S. Cl.
CPC ............. *G02F 1/167* (2013.01); *G09G 3/19* (2013.01); *G02F 2201/44* (2013.01); *G09G 3/36* (2013.01); *G09G 2300/023* (2013.01)

(58) Field of Classification Search
CPC ... G02F 1/13306; G02F 1/1333; G02F 1/167
USPC .......................... 349/12, 33, 34, 83, 115, 142
See application file for complete search history.

(56) References Cited

U.S. PATENT DOCUMENTS

| | | | | |
|---|---|---|---|---|
| 6,212,805 B1 * | 4/2001 | Hill | .......................... | B44F 1/066 40/442 |
| 2004/0145562 A1 * | 7/2004 | Horikiri | .................. | G02F 1/167 345/107 |
| 2005/0018272 A1 * | 1/2005 | Kimura | .................. | G02B 26/02 359/295 |
| 2006/0187528 A1 * | 8/2006 | Hagood | ............... | G02B 6/0043 359/298 |
| 2007/0171212 A1 * | 7/2007 | Sakurai | ................. | G06F 3/0436 345/177 |
| 2007/0206156 A1 * | 9/2007 | Quach | .................. | G03B 21/604 353/20 |

(Continued)

FOREIGN PATENT DOCUMENTS

| | | |
|---|---|---|
| JP | 2008-102660 A | 5/2008 |
| JP | 2011-075663 A | 4/2011 |

* cited by examiner

*Primary Examiner* — Sang V Nguyen

(74) *Attorney, Agent, or Firm* — Lerner, David, Littenberg, Krumholz & Mentlik, LLP

(57) ABSTRACT

A display device may include a display portion to maintain a display state in accordance with a voltage applied thereto; and a plurality of light transmission regions adjacent to the display portion at positions corresponding to a plurality of light sources arranged over the display portion.

17 Claims, 10 Drawing Sheets

(56) References Cited

U.S. PATENT DOCUMENTS

| | | | |
|---|---|---|---|
| 2008/0278798 A1* | 11/2008 | Hagood | G02B 26/02 359/298 |
| 2009/0147185 A1* | 6/2009 | Quach | G02F 1/167 349/69 |
| 2009/0293329 A1* | 12/2009 | Kim | G09F 13/22 40/442 |
| 2010/0176719 A1* | 7/2010 | Hirakata | H01L 25/048 313/504 |
| 2010/0184510 A1* | 7/2010 | Nittou | G07F 17/3211 463/30 |
| 2011/0051043 A1* | 3/2011 | Kim | G02B 6/0068 349/64 |
| 2011/0164034 A1* | 7/2011 | Bennett | G06F 3/14 345/419 |
| 2011/0279755 A1* | 11/2011 | Nittou | A63F 13/08 349/77 |
| 2012/0105954 A1* | 5/2012 | Prouty, IV | G02B 27/2214 359/462 |
| 2012/0176570 A1* | 7/2012 | Yamazaki | G02F 1/1334 349/86 |
| 2013/0335657 A1* | 12/2013 | Kira | G02F 1/1335 349/41 |
| 2014/0184573 A1* | 7/2014 | Nemchuk | G02B 26/0833 345/204 |

DISPLAYING MEDIUM AND DISPLAYING APPARATUS

CROSS REFERENCE TO RELATED APPLICATIONS

This application claims the benefit of Japanese Priority Patent Application JP 2013-155857 filed Jul. 26, 2013, the entire contents of which are incorporated herein by reference.

BACKGROUND

The present disclosure relates to a displaying medium and a displaying apparatus.

For example, JP 2011-75663A (hereinafter referred to as Patent Literature 1) discloses a displaying apparatus in which an electronic paper device which can be set to be transparent is arranged on the front face of a light-emitting display. Moreover, JP 2008-102660A (hereinafter referred to as Patent Literature 2) discloses a configuration in which an electronic paper device is included to be superimposed on a liquid crystal display.

SUMMARY

While the configurations disclosed in Patent Literature 1 and Patent Literature 2 above allow output light from the light-emitting display to be outputted through the electronic paper device, the electronic paper device is difficult to be completely transparent. Hence, there is a problem that the brightness of the light emitted from the light-emitting display decreases when it passes through the electronic paper device.

Moreover, since a typical displaying apparatus has its displaying face black when the power is turned OFF, the displaying apparatus does not match surrounding furniture, walls or the like in a living space, this sometimes causing uncomfortable feeling. In particular, a large-sized displaying apparatus can cause significant uncomfortable feeling.

It is desirable to suppress a decrease of brightness in a configuration in which a displaying medium such as an electronic paper device is superimposed on a display that displays video to be adapted to the surrounding environment.

According to an embodiment of the present disclosure, there is provided a displaying medium including a displaying part configured to maintain displaying in accordance with an application state of voltage, and a plurality of light transmission regions provided adjacent to the displaying part, corresponding to positions of a plurality of light sources of a display which is arranged to be superimposed on the displaying part.

The transmission region may be configured of a space provided in a region adjacent to the displaying part.

The transmission region may be configured of a transparent member provided in a region adjacent to the displaying part.

The displaying part may include a plurality of cells to which the voltage is applied independently and liquid crystals which the cells are filled with.

A planar shape of the transmission region may be circular, elliptical, rectangular, or slit-shaped.

The displaying medium may be configured of a reflective electronic paper device.

According to an embodiment of the present disclosure, there is provided a displaying apparatus including a self-light emitting display including a plurality of light sources, and a flat plate-shaped displaying medium arranged to be superimposed on a displaying face of the display. The displaying medium includes a displaying part configured to maintain displaying in accordance with an application state of voltage, and a plurality of light transmission regions provided adjacent to the displaying part, corresponding to positions of the plurality of light sources of the display.

A width of the light source of the display may be shorter than a width of the transmission region corresponding to the light source.

Displaying of the displaying medium may be controlled in accordance with a light-emitting state of the display.

When video displaying of the display is turned ON, the displaying of the displaying medium may be turned OFF, and when the video displaying of the display is turned OFF, the displaying of the displaying medium may be turned ON.

When the displaying of the displaying medium is turned ON, the displaying medium may display a still image, and when the displaying of the displaying medium is turned OFF, the displaying medium may be set to a transparent state.

An angular field of view in emission of light from the light sources may be 30° or more.

A contrast ratio in the displaying of the displaying medium may be 10:1 or more.

An area ratio between the displaying part and the transmission region of the displaying medium may be 10:1 or more.

A touch sensor may be included on a surface of the displaying medium.

The transmission region may be configured of a space provided in a region adjacent to the displaying part.

The transmission region may be configured of a transparent member provided in a region adjacent to the displaying part.

The displaying part may include a plurality of cells to which the voltage is applied independently and liquid crystals which the cells are filled with.

A planar shape of the transmission region may be circular, elliptical, rectangular, or slit-shaped.

The displaying medium may be configured of a reflective electronic paper device.

According to an embodiment of the present disclosure, a display device may include a display portion to maintain a display state in accordance with a voltage applied thereto; and a plurality of light transmission regions adjacent to the display portion at positions corresponding to a plurality of light sources arranged over the display portion.

According to an embodiment of the present disclosure, an apparatus may include a display portion to maintain a display state in accordance with a voltage applied thereto; a lighting display including a plurality of light sources; and a plurality of light transmission regions adjacent to the display portion at positions corresponding to the plurality of light sources arranged over the display portion.

According to one or more embodiments of the present disclosure, a decrease of brightness can be suppressed in a configuration in which a displaying medium such as an electronic paper device is superimposed on a display that displays video to be adapted to the surrounding environment.

BRIEF DESCRIPTION OF THE DRAWINGS

FIG. 4 is a schematic cross-sectional view illustrating a state where display in the LED array is turned ON;

DETAILED DESCRIPTION OF THE EMBODIMENT(S)

Figure 1:
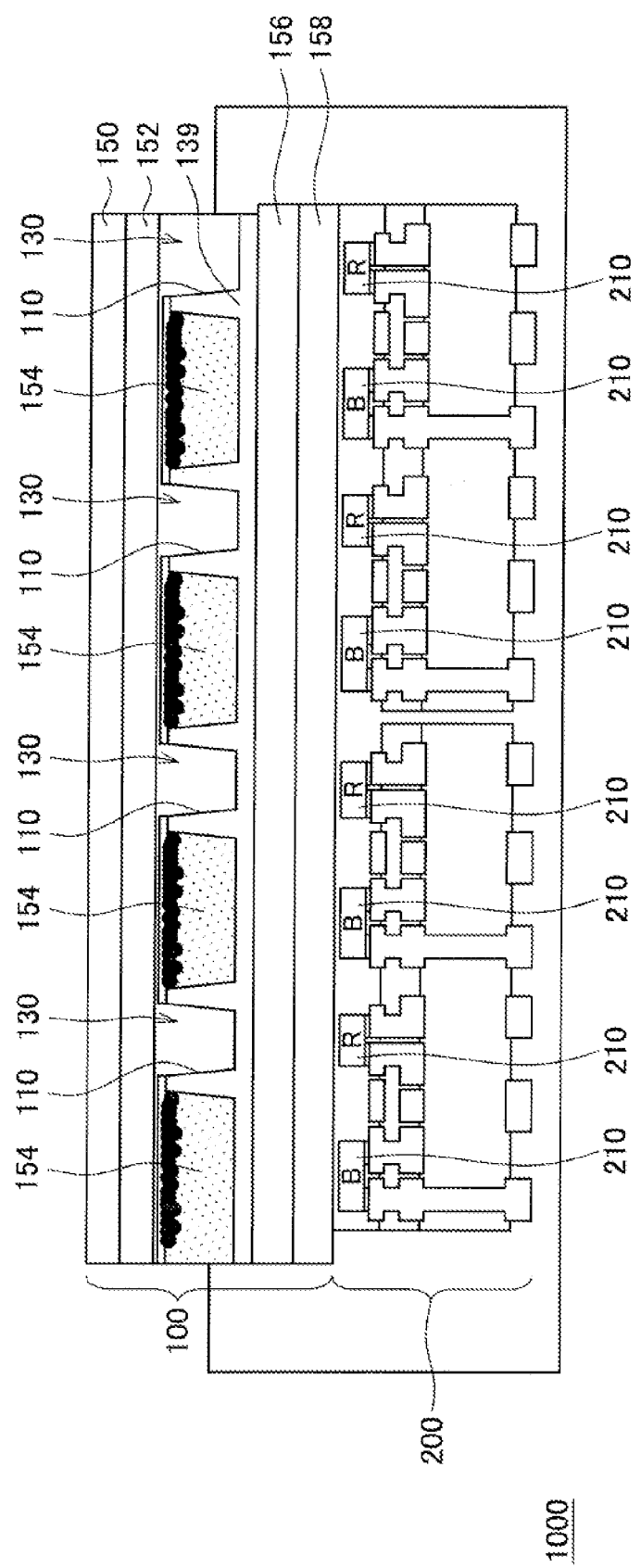
FIG. 1 is a schematic cross-sectional view illustrating a configuration of a displaying apparatus according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Notably, the description is made in the following order.
1. Exemplary Configuration of Displaying Apparatus
2. Contrast Ratio of Display
3. Example in Slit Structure
4. Display State in Displaying Apparatus According to Embodiment

1. Exemplary Configuration of Displaying Apparatus

First, a configuration of a displaying apparatus according to an embodiment of the present disclosure is described with reference to FIG. 1. FIG. 1 is a schematic cross-sectional view illustrating a configuration of a displaying apparatus 1000 according to an embodiment of the present disclosure. As illustrated in FIG. 1, the displaying apparatus 1000 is configured as a hybrid display in which an electronic paper device (ePaper) 100, which is a reflective display medium, is superimposed on a lighting display 200, such as an LED array, which is a self-light emitting display. The LED array 200 is a self-light emitting display in which as many very fine LEDs 210 for each color of R (red)/G (green)/B (blue) as pixels are arranged. Notably, the lighting display is exemplarily represented by the LED array 200 in the embodiment, whereas it may employ any other display, for example, may be a display such as an organic EL display (OLED), a crystal LED display (CLED) or liquid crystal display (LCD). The electronic paper device 100 performs display using reflected light similarly to printed normal paper.

Figure 2:
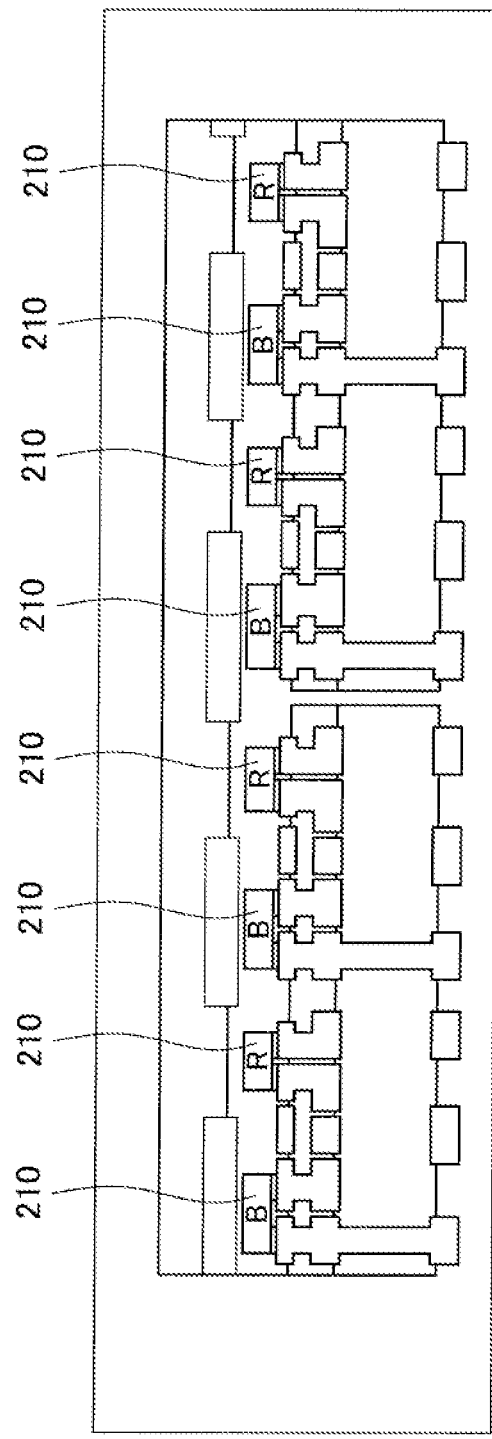
FIG. 2 is a schematic cross-sectional view illustrating a configuration of an LED array.

FIG. 2 is a schematic cross-sectional view illustrating a configuration of the LED array 200. The LED array 200 includes the plurality of LEDs 210 as point light sources and displays desired video (moving image or the like) by lighting the LEDs 210. The pitch between the LEDs 210 by way of example is 100 μm.

Figure 3:
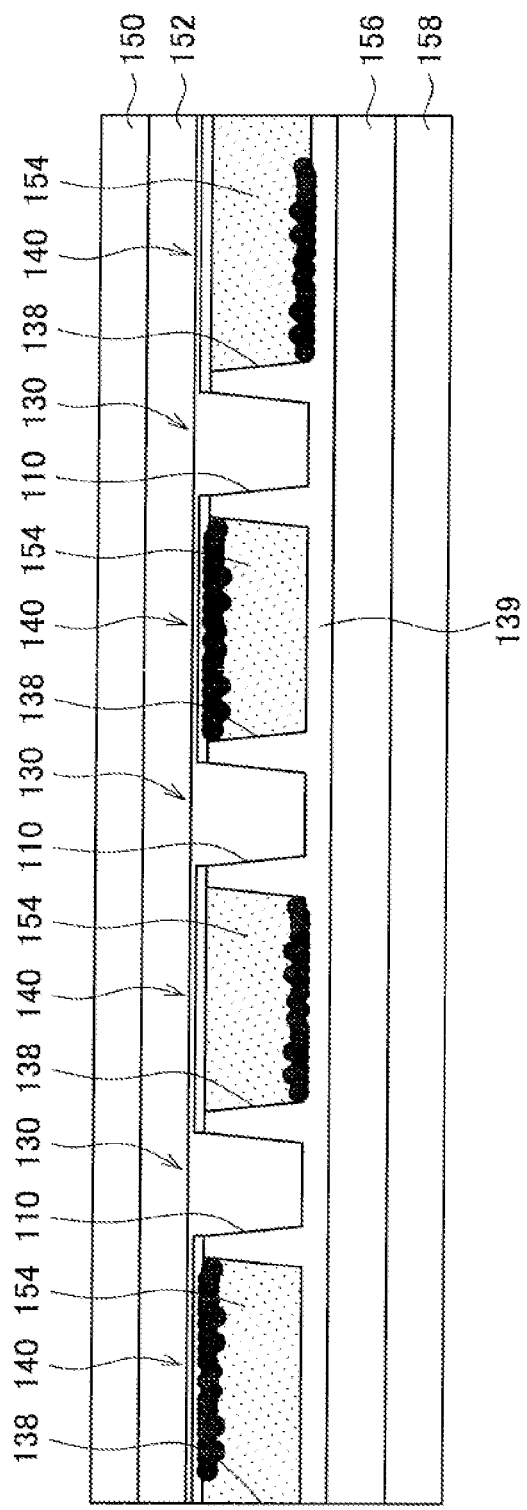
FIG. 3 is a schematic cross-sectional view illustrating a configuration of an electronic paper device.

In FIG. 1, the electronic paper device 100 is arranged on the top face of the LED array 200, that is, outside the LED array 200 (closer to the viewer). FIG. 3 is a schematic cross-sectional view illustrating a configuration of the electronic paper device 100. The electronic paper device 100 includes layers of a transparent substrate 150, a transparent electrode 152, cholesteric liquid crystal 154, a transparent electrode 156 and a transparent substrate 158 in the order from the top. Moreover, the electronic paper device 100 has a separator 139 for composing cells (microcapsules) 138. The transparent substrates 150 and 158 are substrates transmitting light such, for example, as glass substrates. The transparent electrodes 152 and 156 are formed on the transparent substrates 150 and 158 and are transparent electrodes such, for example, as ITO (Indium Tin Oxide) electrodes. Voltage can be applied to the cholesteric liquid crystal 154 using the transparent electrodes 152 and 156. The cholesteric liquid crystal 154 can maintain any of two states of transmitting light or reflecting the same with no application of power. The cholesteric liquid crystal 154 is partitioned by the separator 139 into the cells 138 for individual predetermined regions and the cells 138 compose displaying parts 140. Voltage is applied to the individual cells 138 by the transparent electrodes 152 and 156. Once the voltage is applied thereto, the display state of the cells 138 is defined according to the voltage having been already applied thereto with no further application of voltage. Accordingly, the electronic paper device 100 can maintain the transparent state of the cells 138 or the state thereof where information is displayed with no application of voltage.

Specifically, according to the voltage applied to the upper and lower transparent electrodes 152 and 156, display in arbitrary concentration (grayscale) from white to black for each cell 138 is performed. After the upper and lower transparent electrodes 152 and 156 applies the voltage, the display state in the arbitrary concentration is maintained. Accordingly, the electronic paper device 100 can display arbitrary text, patterns and the like with no power consumption. In the embodiment, it is supposed that the electronic paper device 100 performs black-and-white display, whereas color display may be performed.

The electronic paper device 100 is provided with spaces or holes (windows) 110 as light transmission regions 130 in regions which correspond to the LEDs 210 in the LED array 200. The holes 110 are arranged to be adjacent to the displaying parts 140 composed of the cells and the holes 110 constitute spaces. The planar shape of the holes 110 as seen from the viewer may be an arbitrary shape, for example, circular, elliptical, rectangular, slit-shaped or the like. The holes 110 as the transmission regions 130 are formed to have a width wider than that of the LEDs 210. In FIG. 3, the holes 110 are provided to have a depth corresponding to the thickness of the cholesteric liquid crystal 154, whereas they may be provided to be through holes which penetrate the whole thickness of the electronic paper device 100.

Figure 4:
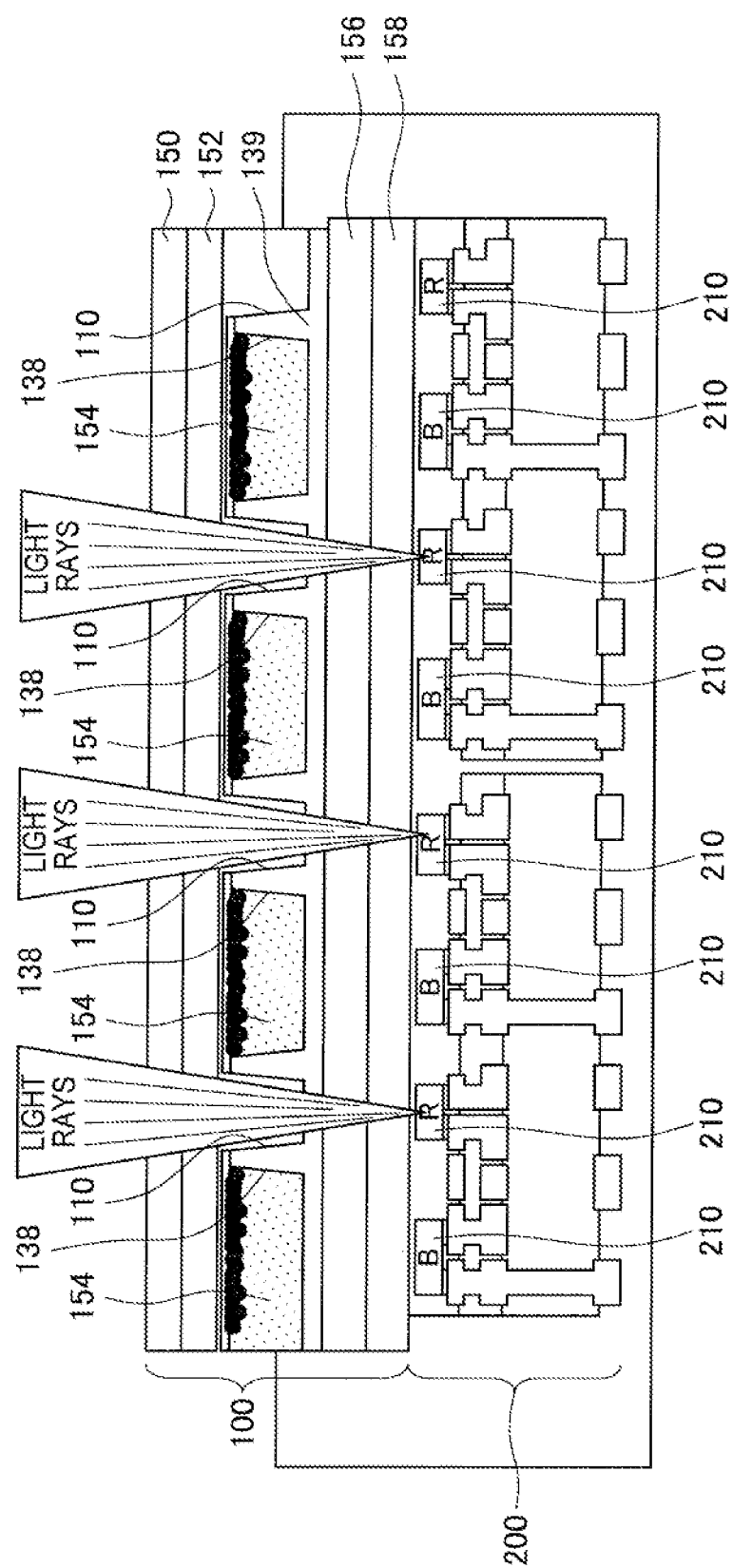

FIG. 4 is a schematic cross-sectional view illustrating an ON-state of display in the LED array 200. When the display in the LED array 200 is turned ON and the displaying apparatus 1000 displays normal video (moving image), the LEDs 210 of the LED array 200 emit light. The light emitted by the LEDs 210 is allowed to pass through the holes 110 provided corresponding to the LEDs 210 and is seen by the user (viewer). Moreover, in this case, the electronic paper device 100 is set to an OFF-state (transparent state) by applying predetermined voltage to the transparent electrodes 152 and 156.

Notably, in FIG. 1, FIG. 4 and the like, while all of the LEDs 210 are presented in one cross section for convenience, the LEDs 210 not corresponding to the transmission regions 130 in the figures still correspond to the positions of the transmission regions 130 that are formed in a different cross section of the electronic paper device 100.

As above, providing the holes 110 at the positions corresponding to the LEDs 210 allows the viewer to see the video with no decrease in brightness of the LED array 200 still in the configuration in which the electronic paper device 100 is superimposed on the LED array 200, similarly to the case of the electronic paper device 100 not superimposed thereon.

Figure 5:
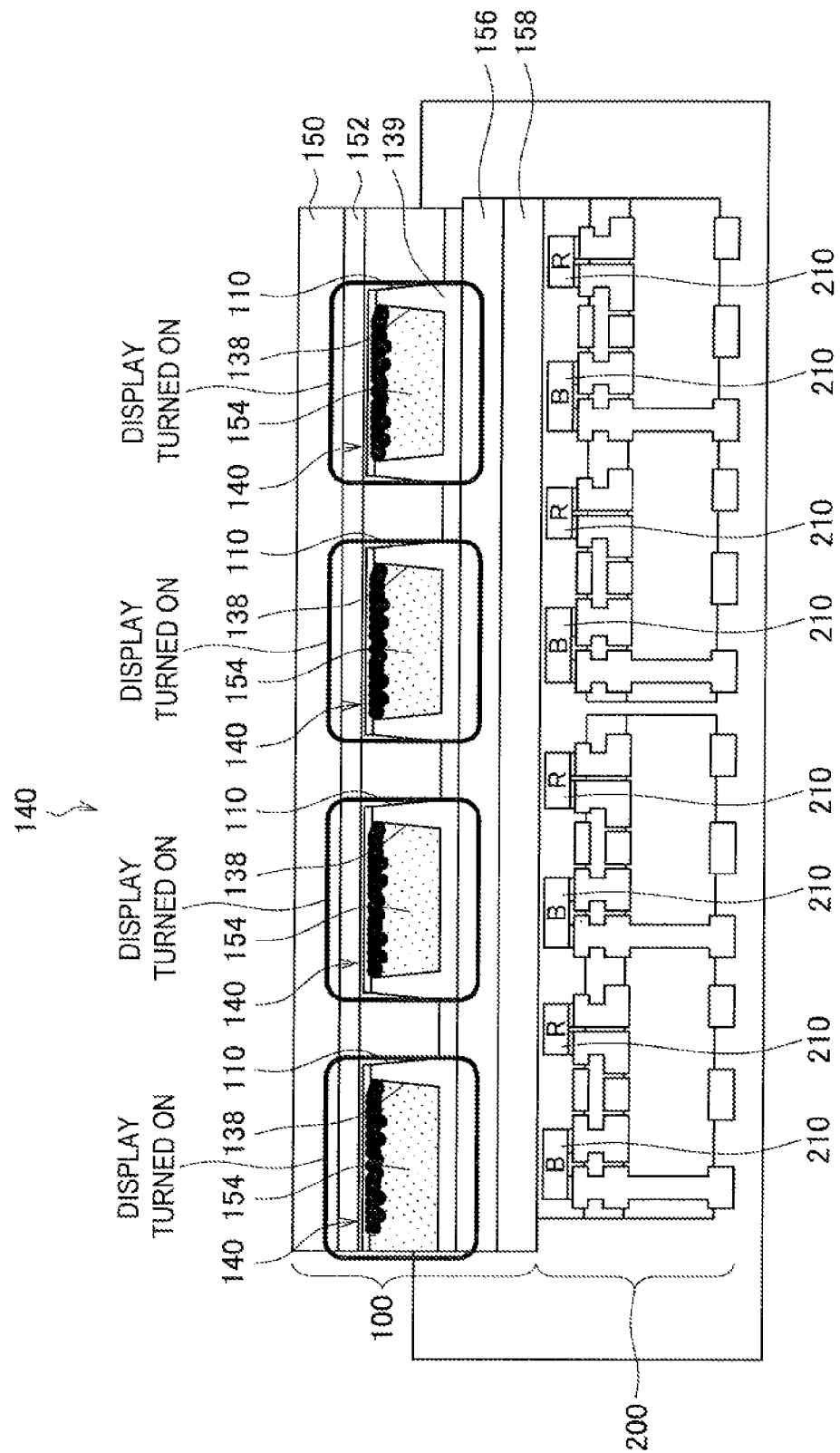
FIG. 5 is a schematic cross-sectional view illustrating a state where the display in the LED array is turned OFF.

On the other hand, FIG. 5 is a schematic cross-sectional view illustrating an OFF-state of display in the LED array 200. When the display in the LED array 200 is turned OFF, light rays are not emitted from the LEDs 210. Predetermined voltage is applied to the transparent electrodes 152 and 156 of the electronic paper device 100 to set the electronic paper device 100 to the ON-state, and a still image containing text, patterns and the like is displayed on the displaying parts 140. The display in the electronic paper device 100 is not performed in a manner of the display performed by the lighting display 200, such as in a self-light emitting manner, but in a reflective manner with reflection of the ambient light. Hence, the displaying does not stand out too much but the displaying apparatus 1000 can be matched with furniture, walls and the like in a living room or the like. Accordingly, in the non-display state of the displaying apparatus 1000, the displaying apparatus 1000 can be adapted to the living space, this enabling the presence of the displaying apparatus 1000 not to stand out.

Figure 6:
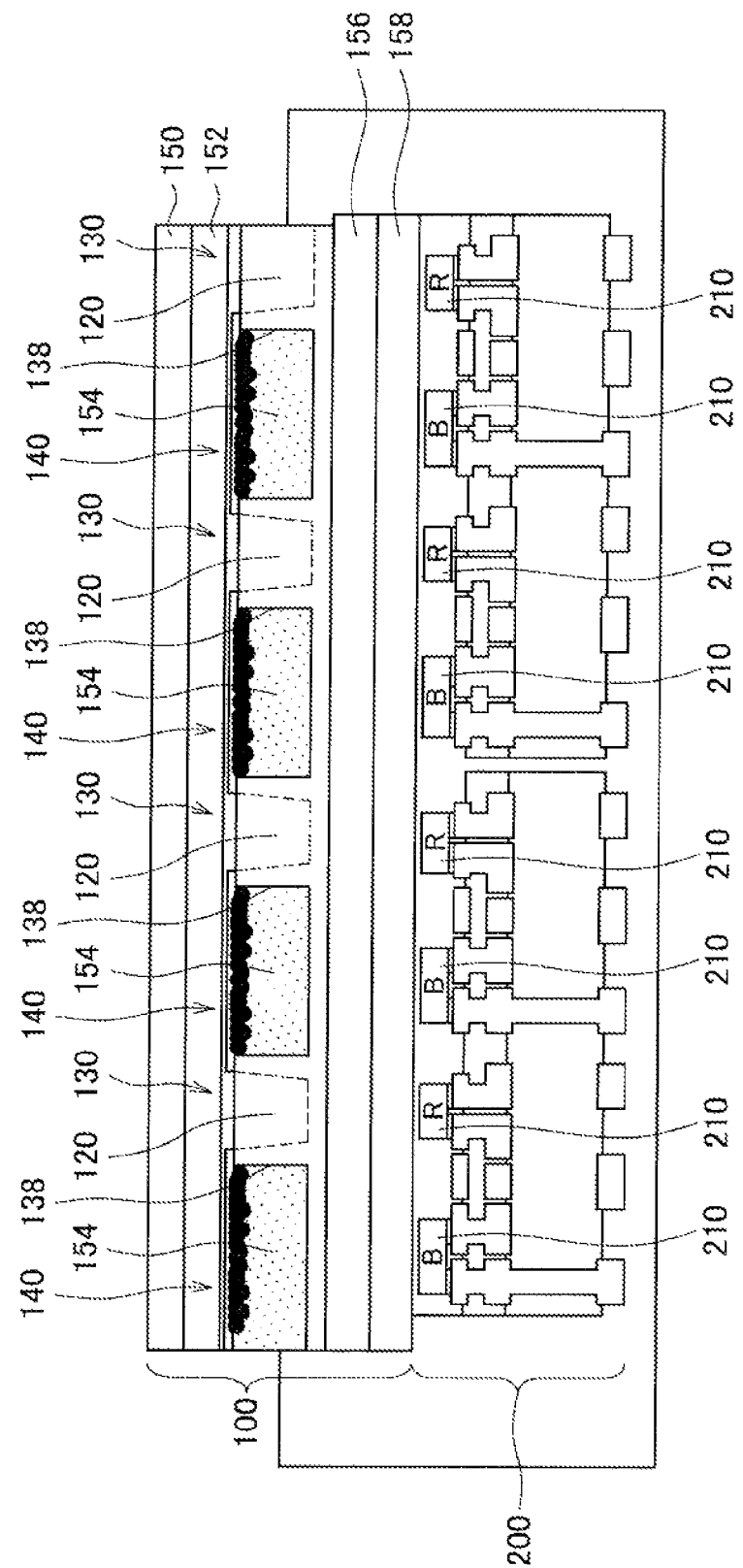
FIG. 6 is a schematic diagram illustrating an example in which transparent materials are provided in place of holes as light transmission regions of the electronic paper device.

FIG. 6 is a schematic diagram illustrating an example in which transparent materials 120 are provided in place of the holes 110 as the light transmission regions 130 of the electronic paper device 100. In the case of this exemplary configuration, instead of providing the holes 110, the transparent materials 120 realize the light transmission regions 130 in the electronic paper device 100. For example, embossed portions made of the transparent materials 120 can realize the windows as the transmission regions 130. In this case, the transparent materials 120 can be associated or integrated with the separator 139. Forming the transmission regions 130 using the transparent materials 120 can eliminate flare caused by diffuse reflection on the surface of the electronic paper device 100. Moreover, since post processing of boring is not necessary, the productivity can be improved.

Figure 7:
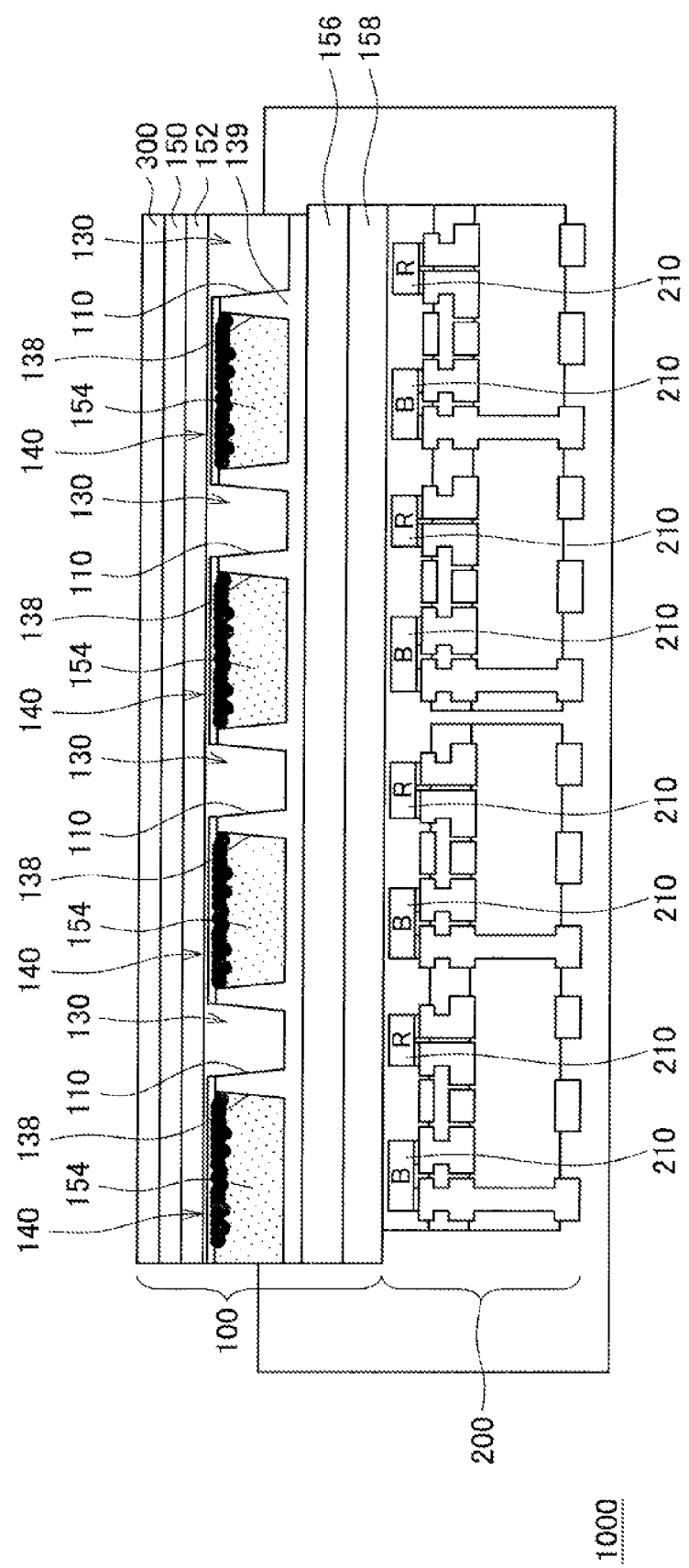
FIG. 7 is a schematic diagram illustrating an example in which a touch sensor is arranged on the electronic paper device and the displaying apparatus is configured as a touch panel.

FIG. 7 is a schematic diagram illustrating an example in which a touch sensor 300 is arranged on the electronic paper device 100 and the displaying apparatus 1000 is configured as a touch panel. The touch sensor 300 can employ a transparent sensor of an electrostatic capacity type, a resistance film type or the like. The touch sensor 300 is arranged on the front face of the displaying apparatus 1000, and thereby, information of operation by the user can be inputted in the displaying apparatus 1000 in any of the ON-case and the OFF-case of display in the LED array 200, this allowing the desired operation.

As above, the displaying apparatus 1000 according to the embodiment attains the followings. Namely, in normal video displaying, the display in the LED array 200 is turned ON, allowing the light emitted by the LEDs 210 to pass through the transmission regions 130 provided corresponding to the LEDs 210 and to be seen by the user (viewer). Moreover, in no normal video displaying, the display in the LED array 200 is turned OFF and arbitrary text, patterns and the like are displayed on the electronic paper device 100, this allowing the displaying apparatus 1000 to be matched with furniture, walls and the like in a living room or the like. Accordingly, since there is no black display screen in turning OFF the power in the case of no normal video displaying, the presence of the displaying apparatus 1000 can be securely allowed not to stand out.

2. Contrast Ratio of Display

Next, a contrast ratio of display in the electronic paper device 100 is described. In the embodiment, in displaying by the electronic paper device 100, the electronic paper device 100 is configured to have a contrast ratio of 10:1 or more between the transmission regions 130 and the displaying parts 140 therein. Typically, since a paper medium has a contrast ratio of 10:1 or more, the contrast ratio of 10:1 or more between the transmission regions 130 and the displaying parts 140 can secure a sufficient contrast ratio still in displaying by the electronic paper device 100. Accordingly, the display in the electronic paper device 100 can be made sufficiently clear.

Moreover, in the embodiment, the electronic paper device 100 is configured to secure an angular field of view of 30° or more in displaying by the LED array 200. Thereby, even when the user does not see the displaying apparatus 1000 right in front thereof, the field of view can be definitely secured.

Figure 8:
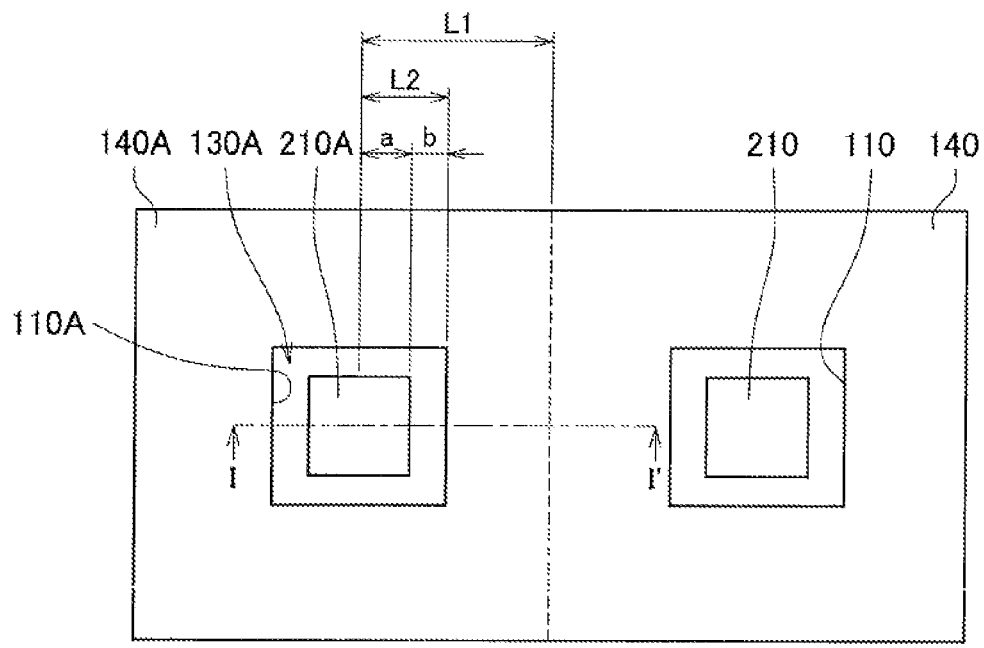
FIG. 8 is a schematic diagram illustrating conditions for configuring an area ratio between a transmission region and a displaying part to be 10:1 or more.
Figure 9:
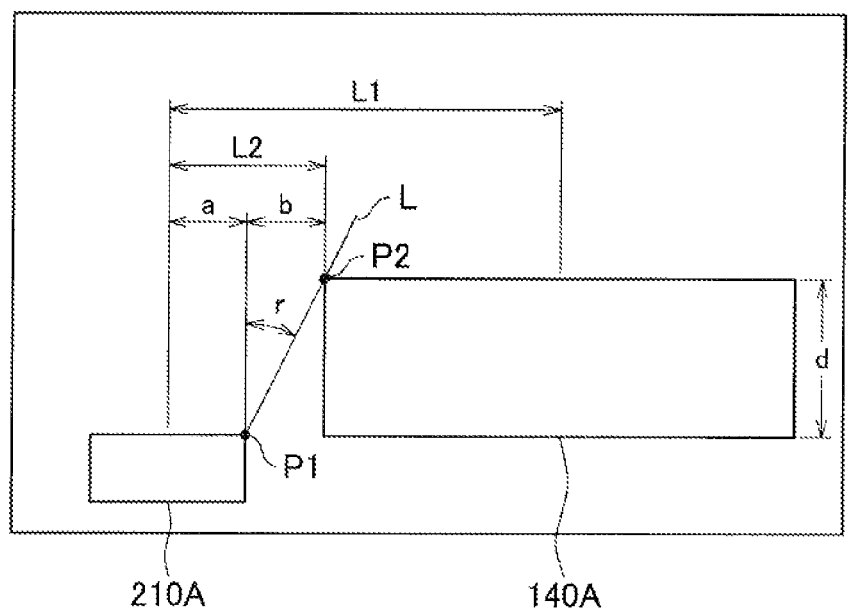
FIG. 9 is a schematic diagram illustrating the conditions for configuring the area ratio between the transmission region and the displaying part to be 10:1 or more.

In order to secure the contrast ratio of 10:1 or more, in the displaying apparatus 1000 according to the embodiment, an area ratio between the transmission regions 130 and the displaying parts 140 is configured to be 10:1 or more. FIG. 8 and FIG. 9 are schematic diagrams illustrating conditions for configuring the area ratio between the transmission regions 130 and the displaying parts 140 to be 10:1 or more. FIG. 8 is a plan view for it. FIG. 9 is a cross-sectional view taken along the dot and dash line I-I' in FIG. 8. FIG. 8 and FIG. 9 illustrate the case where planar shapes of the LED 210, the transmission region 130 and the displaying part 140 are squares and the transmission region 130 is constituted of the hole 110. Herein, the conditions of dimensions for an LED 210A in the left portion of FIG. 8, a transmission region 130A transmitting light from the LED 210A, and a displaying part 140A in the periphery of the transmission region 130A are defined.

In FIG. 8 and FIG. 9, a designates ½ of the length of one side in the LED 210A and b designates the distance from the end part of the LED 210A to a hole 110A. Moreover, L2 designates ½ of the length of one side in the hole 110A and L1 designates ½ of the length of one side in the displaying part 140A (½ of the pixel pitch for the cell 138 constituting the displaying part 140). Moreover, d designates the thickness of the electronic paper device 100 and r designates the angle formed by line L connecting point P1 at the upper end of the LED 210A and point P2 at the upper end of the hole 110A and the emission direction of the light from the LED 210A.

In FIG. 8 and FIG. 9, in order to configure the area ratio between the transmission region 130 and the displaying part 140 to be 10:1 or more, the relation between L2 and L1 is configured to satisfy equation (1) below, the area of the transmission region 130 being L2$^2$ and the area of the displaying part 140 being L1$^2$.

$$L1^2/L2^2 > 10 \quad (1)$$

Moreover, in order to secure the angular field of view to be 30° or more, the value of r satisfies equation (2) below.

$$r > 15° \quad (2)$$

From equation (1), equation (3) below is obtained.

$$L2 < \mathrm{Sqrt}(L1^2/10) \quad (3)$$

Moreover, from equation (2), equation (4) below is obtained.

$$b > d \cdot \tan(15°) \quad (4)$$

Accordingly, the dimension of the LED 210 which is a light-emitting device (=2a) can be represented by equation (5) below.

$$2a = 2(L2-b) < 2 \cdot \{\mathrm{Sqrt}(L1^2/10) - d \cdot \tan(15°)\} \quad (5)$$

The values of L1, L2, b, d and r are determined as above so as to satisfy equation (5), and thereby, the contrast ratio of 10:1 can be secured. Notably, the case where the transmission regions 130 are constituted of the holes 110 is described in the above, whereas, in the case where the transmission regions 130 are composed of the transparent materials 120, the values of L1, L2, b, d and r may be converted based on the optical path length according to the transparent materials 120. In this case, the angular field of view can be secured to be a wider angular field of view since the angle at which the light rays proceed spreads wider due to the difference of the refractive indices when the light rays radiate from the inside of the display into the air. Notably, the above-mentioned conditional expressions are presented for the square grid whose pitch and dimension in the horizontal direction are same as its pitch and dimension in the vertical direction. Also for a non-square grid whose pitch and dimension in the horizontal direction are not same as its pitch and dimension in the vertical direction, securing the contrast ratio of 10:1 enables the displaying in the electronic paper device 100 to be sufficiently clear, and securing the angular field of view to be 30° or more enables the field of view to be definitely secured even when the user does not visually see the displaying apparatus 1000 right in front thereof.

3. Example in Slit Structure

Figure 10:
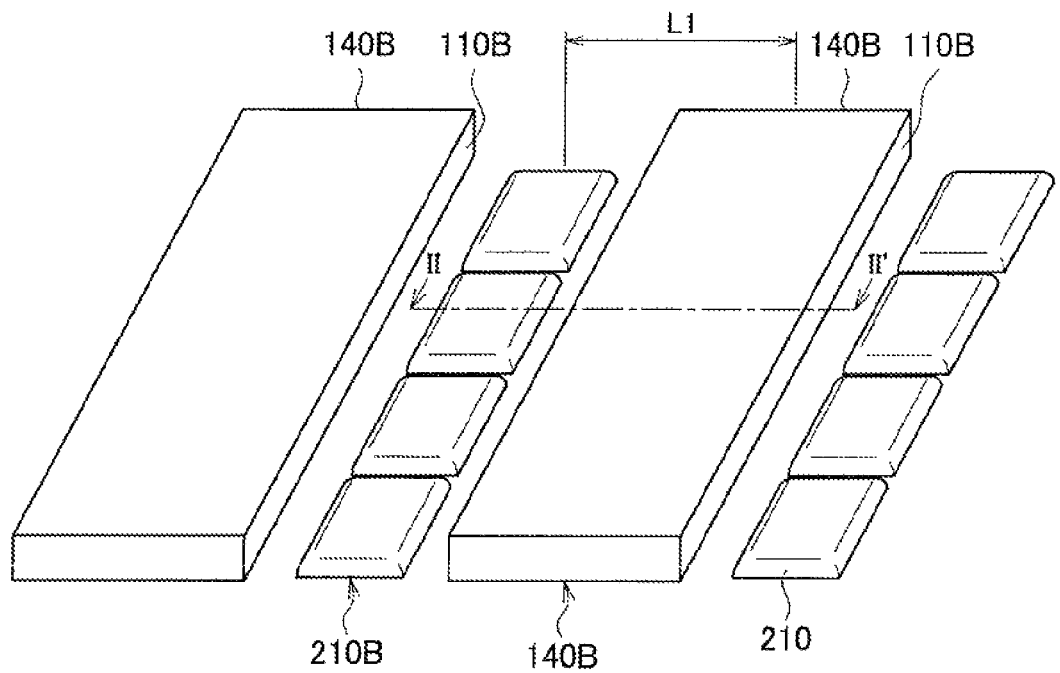
FIG. 10 is a schematic diagram illustrating an example in which the holes which are the transmission regions are provided to be slit-shaped and LEDs are arranged along the holes.

Next, an example in which the transmission regions 130 are provided to be slit-shaped is described. FIG. 10 is a schematic diagram illustrating an example in which holes 110B which are the transmission regions 130 are provided to be slit-shaped and LEDs 210B are arranged along the holes 110B. In this case, displaying parts 140B of the electronic paper device 100 are arranged on both sides of the slit-shaped holes 110B.

Figure 11:
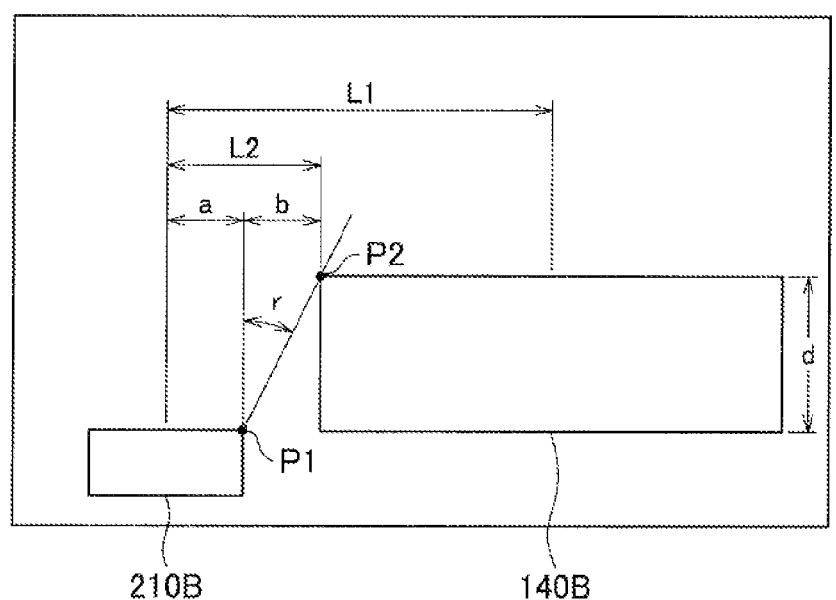
FIG. 11 is a schematic diagram illustrating a cross section taken along the dot and dash line II-II' in FIG. 10.

FIG. 11 is a schematic diagram illustrating a cross-sectional view taken along the dot and dash line II-II' in FIG. 10. In FIG. 11, a designates ½ of the length of the short side in the LED 210B and b designates the distance from the end part of the LED 210B to the hole 110B. Moreover, L2 designates ½ of the length of one side in the hole 110B and L1 designates ½ of the length of the short side in the displaying part 140B (½ of the pixel pitch for the cell 138 constituting the displaying part 140 along II-II'). Moreover, d designates the thickness of the electronic paper device 100 and r designates the angle formed by line L connecting point P1 at the upper end of the LED 210B and point P2 at the upper end of the hole 110B and the emission direction of the light from the LED 210B.

In FIG. 10 and FIG. 11, in order to configure the area ratio between the transmission region 130 and the displaying part 140 of the electronic paper device 100 to be 10:1 or more, the relation between L2 and L1 is configured to satisfy equation (6) below, the area ratio between the transmission region 130 and the displaying part 140 being L1/L2.

$$L1/L2 > 10 \quad (6)$$

Moreover, in order to secure the angular field of view to be 30° or more, the value of r satisfies equation (7) below.

$$r > 15° \quad (7)$$

From equation (6), equation (8) below is obtained.

$$L2 < L1/10 \quad (8)$$

Moreover, from equation (7), equation (9) below is obtained.

$$b > d \cdot \tan(15°) \quad (9)$$

Accordingly, the dimension of the LED 210 which is a light-emitting device (=2a) can be represented by equation (10) below.

$$2a = 2(L2-b) < 2 \cdot \{\mathrm{Sqrt}(L1^2/10) - d \cdot \tan(15°)\} \quad (10)$$

As above, in the slit structure, the values of L1, L2, b and d are determined so as to satisfy equation (10), and thereby, the contrast ratio of 10:1 can be secured, this enabling the angular field of view to be secured to be 30° or more.

4. Display State in Displaying Apparatus According to Embodiment

Figure 12:
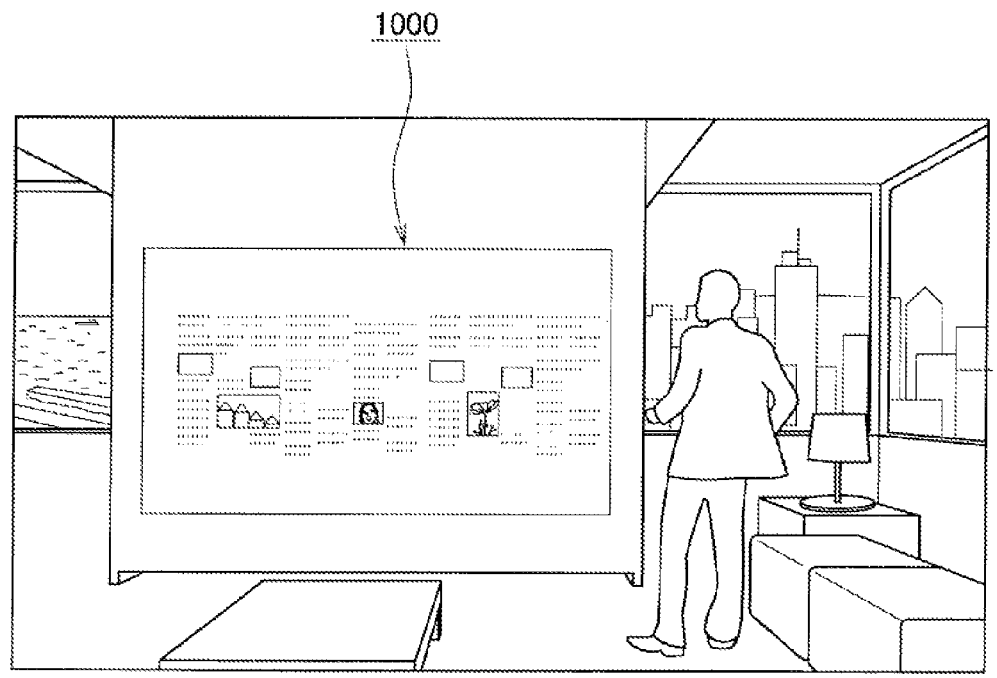
FIG. 12 is a schematic diagram illustrating the displaying apparatus according to the embodiment in power turned OFF.

FIG. 12 is a schematic diagram illustrating the displaying apparatus 1000 according to the embodiment in power turned OFF. FIG. 12 presents the state where the display in the LED array 200 is turned OFF and the displaying parts 140 of the electronic paper device 100 display a still image such as text, patterns and the like. In this case, the electronic paper device 100 displays the text, patterns and the like at an appropriate grayscale. These texts, patterns and the like are displayed using reflected light similarly to normal paper. Thereby, the displaying apparatus 1000 can match the interior decoration and the displaying apparatus 1000 can decrease its presence in the living space. Accordingly, except during the usage of the displaying apparatus 1000, the living space can be made much calm.

Figure 13:
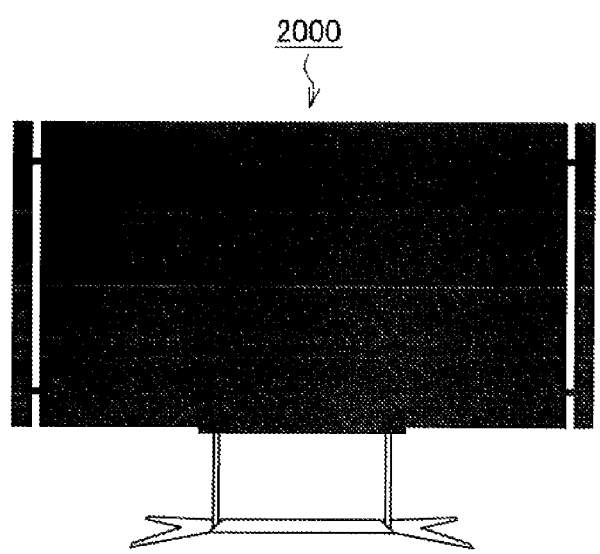
FIG. 13 is a schematic diagram illustrating an existing displaying apparatus whose displaying is turned OFF for comparison with that in FIG. 12.

On the other hand, FIG. 13 illustrates the state where the display in an existing displaying apparatus 2000 is turned OFF for comparison. As already mentioned, the displaying apparatus 2000 has the display screen black when the power is turned OFF and the displaying apparatus 2000 significantly puts its presence on those who stay therearound, this also causing the feeling of oppression on those. Hence, the existing displaying apparatus 2000 illustrated in FIG. 12 does not match its surroundings and it is difficult to realize the environment to be calm.

As described above, the electronic paper device 100 is arranged on the front face of the LED array 200 which performs the video displaying, and the light transmission regions 130 are provided at the positions in the electronic paper device 100 corresponding to the LEDs 210. Thereby, in the ON-state of the video displaying in the LED array 200, the emitted light from the LEDs 210 can be allowed to pass through the transmission regions 130, leading to the video which provides much sense of presence to be seen by the viewer with no deterioration in brightness. Moreover, in the OFF-state of the video displaying, the electronic paper device 100 performs the reflective displaying, and therefore, the presence of the displaying apparatus 1000 can be made less such that the displaying apparatus 1000 is adapted to the surrounding environment thereof.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

A display device including:
  a display portion to maintain a display state in accordance with a voltage applied thereto; and a plurality of light transmission regions adjacent to the display portion at positions corresponding to a plurality of light sources arranged over the display portion.
(2) The display device according to (1),
  wherein at least one of the plurality of light transmission regions is a space.
(3) The display device according to (1) or (2),
  wherein at least one of the plurality of light transmission regions includes a transparent material.
(4) The display device according to any one of (1) to (3) further including:
  a separator that configures the display portion, wherein the transparent material is associated with the separator.
(5) The display device according to any one of (1) to (4),
  wherein the transparent material forms an embossed portion.
(6) The display device according to any one of (1) to (5),
  wherein the plurality of light transmission regions and parts of the display portion are configured such that a contrast ratio between the plurality of light transmission regions and the parts of the display portion is at least 10:1.
(7) The display device according to any one of (1) to (6),
  wherein an area ratio between the plurality of light transmission regions and parts of the display portions is at least 10:1.
(8) The display device according to any one of (1) to (7),
  wherein the plurality of light transmission regions and parts of the display portions are configured such that an angular field of view of displaying by the plurality of light sources is at least 30°.
(9) The display device according to any one of (1) to (8),
  wherein the light transmission regions have a width wider than a width of the light sources.
(10) The display device according to any one of (1) to (9),
  wherein the display portion is a reflective display medium.
(11) The display device according to any one of (1) to (10),
  wherein the reflective display medium is an electronic paper device.
(12) The display device according to any one of (1) to (11),
  wherein at least one of the light transmission regions is a planar shape.
(13) The display device according to any one of (1) to (12),
  wherein the planar shape is at least one of circular, elliptical, rectangular or slit-shaped.
(14) The display device according to any one of (1) to (13),
  wherein the display portion includes a plurality of cells, wherein the light transmission regions are arranged adjacent the cells.
(15) The display device according to any one of (1) to (14),
  wherein at least one of the cells includes liquid crystal material.
(16) An apparatus including:
  a display portion to maintain a display state in accordance with a voltage applied thereto; a lighting display including a plurality of light sources; and a plurality of light transmission regions adjacent to the display portion at positions corresponding to the plurality of light sources arranged over the display portion.
(17) The apparatus according to (16) further including:
  a touch sensor arranged on a face of the apparatus.
(18) The apparatus according to (16) or (17),
  wherein the plurality of light sources includes LEDs in an array.
(19) The apparatus according to any one of (16) to (18),
  wherein the display portion is controlled in accordance with a state of the lighting display.
(20) The apparatus according to any one of (16) to (19),
  wherein, when the state of the lighting display is OFF, the display state of the display portion is ON.
(21) A displaying medium including:
  a displaying part configured to maintain displaying in accordance with an application state of voltage; and a plurality of light transmission regions provided adjacent to the displaying part, corresponding to positions of a plurality of light sources of a display which is arranged to be superimposed on the displaying part.
(22) The displaying medium according to (21),
  wherein the transmission region is configured of a space provided in a region adjacent to the displaying part.
(23) The displaying medium according to (21) or (22),
  wherein the transmission region is configured of a transparent member provided in a region adjacent to the displaying part.
(24) The displaying medium according to any one of (21) to (23),
  wherein the displaying part includes a plurality of cells to which the voltage is applied independently and liquid crystals which the cells are filled with.
(25) The displaying medium according to any one of (21) to (24),
  wherein a planar shape of the transmission region is circular, rectangular, or slit-shaped.
(26) The displaying medium according to any one of (21) to (25),
  wherein the displaying medium is configured of a reflective electronic paper device.
(27) A displaying apparatus including:
  a self-light emitting display including a plurality of light sources; and a flat plate-shaped displaying medium arranged to be superimposed on a displaying face of the display, wherein the displaying medium includes a displaying part configured to maintain displaying in accordance with an application state of voltage, and a plurality of light transmission regions provided adjacent to the displaying part, corresponding to positions of the plurality of light sources of the display.

(28) The displaying apparatus according to (27), wherein a width of the light source of the display is shorter than a width of the transmission region corresponding to the light source.

(29) The displaying apparatus according to (27) or (28), wherein displaying of the displaying medium is controlled in accordance with a light-emitting state of the display.

(30) The displaying apparatus according to any one of (27) to (29), wherein when the displaying of the displaying medium is turned ON, the displaying medium displays a still image, and when the displaying of the displaying medium is turned OFF, the displaying medium is set to a transparent state.

(31) The displaying apparatus according to any one of (27) to (30), wherein when the displaying of the displaying medium is turned ON, the displaying medium displays a still image.

(32) The displaying apparatus according to any one of (27) to (31), wherein an angular field of view in emission of light from the light sources is 30° or more.

(33) The displaying apparatus according to any one of (27) to (32), wherein a contrast ratio in the displaying of the displaying medium is 10:1 or more.

(34) The displaying apparatus according to any one of (27) to (33), wherein an area ratio between the displaying part and the transmission region of the displaying medium is 10:1 or more.

(35) The displaying apparatus according to any one of (27) to (34), wherein a touch sensor is included on a surface of the displaying medium.

(36) The displaying apparatus according to any one of (27) to (35), wherein the transmission region is configured of a space provided in a region adjacent to the displaying part.

(37) The displaying apparatus according to any one of (27) to (36), wherein the transmission region is configured of a transparent member provided in a region adjacent to the displaying part.

(38) The displaying apparatus according to any one of (27) to (37), wherein the displaying part includes a plurality of cells to which the voltage is applied independently and liquid crystals which the cells are filled with.

(39) The displaying apparatus according to any one of (27) to (38), wherein a planar shape of the transmission region is circular, rectangular, or slit-shaped.

(40) The displaying apparatus according to any one of (27) to (39), wherein the displaying medium is configured of a reflective electronic paper device.

What is claimed is:

1. A display device comprising:
   a display portion partitioned into a plurality of cells configured to select and maintain one of a transparent state or a reflective state as a display state in accordance with a voltage applied thereto, such that the cells are configured to (i) select and maintain the transparent state when a first voltage is applied thereto and (ii) select and maintain the reflective state when a second voltage is applied thereto; and
   a plurality of light transmission regions adjacent to the cells and at positions corresponding to a plurality of light sources arranged over the display portion so as to be in-line therewith in a thickness direction which is perpendicular to a display surface of the display portion, such that a respective one of the light transmission regions is arranged adjacent to a number of respective cells and at a respective position which corresponds to a respective light source so as to be in-line with the respective light source in the thickness direction,
   in which the display portion has a viewer side associated therewith from which a viewer is able to view an image during operation,
   in which each of the cells includes a corresponding display part such that the plurality of cells has a plurality of display parts, and the display parts enable a still image, text or pattern to be displayed thereon when the light sources are not actively emitting light, and
   in which the transparent state corresponds to an ON-state with light actively emitted from the light sources and the reflective state corresponds to an OFF-state with light not actively emitted from the light sources such that when the cells are in the transparent state emitted light from the plurality of light sources is allowed to pass through the light transmission regions so as to be seen by the viewer from the viewer side, and when the cells are in the reflective state light is not emitted from the plurality of light sources and the still image, text or pattern is caused to be displayed on the display parts of the cells by reflection of ambient light on the display parts so as to be seen by the viewer from the same viewer side.

2. The display device of claim 1, wherein at least one of the plurality of light transmission regions is a space.

3. The display device of claim 1, wherein at least one of the plurality of light transmission regions includes a transparent material.

4. The display device of claim 3 further comprising:
   a separator that configures the display portion, wherein the transparent material is associated with the separator.

5. The display device of claim 4, wherein the transparent material forms an embossed portion.

6. The display device of claim 1, wherein the plurality of light transmission regions and the display parts of the cells of the display portion are configured such that a contrast ratio between the plurality of light transmission regions and the parts of the display portion is at least 10:1.

7. The display device of claim 1, wherein an area ratio between the plurality of light transmission regions and the display parts of the cells of the display portions is at least 10:1.

8. The display device of claim 1, wherein the plurality of light transmission regions and the display parts of the cells of the display portions are configured such that an angular field of view of displaying by the plurality of light sources is at least 30°.

9. The display device of claim 1, wherein the light transmission regions have a width wider than a width of the light sources.

10. The display device of claim 1, wherein the display portion is a reflective display medium.

11. The display device of claim 10, wherein the reflective display medium is an electronic paper device.

12. The display device of claim 1, wherein at least one of the light transmission regions is a planar shape.

13. The display device of claim 12, wherein the planar shape is at least one of circular, elliptical, rectangular or slit-shaped.

14. The display device of claim 1, wherein at least one of the cells includes liquid crystal material.

15. An apparatus comprising:
a display portion partitioned into a plurality of cells configured to select and maintain one of a transparent state or a reflective state as a display state in accordance with a voltage applied thereto, such that the cells are configured to (i) select and maintain the transparent state when a first voltage is applied thereto and (ii) select and maintain the reflective state when a second voltage is applied thereto;
a lighting display including a plurality of light sources; and
a plurality of light transmission regions adjacent to the cells and at positions corresponding to the plurality of light sources arranged over the display portion so as to be in-line therewith in a thickness direction which is perpendicular to a display surface of the display portion, such that a respective one of the light transmission regions is arranged adjacent to a number of respective cells and at a respective position which corresponds to a respective light source so as to be in-line with the respective light source in the thickness direction,
in which the apparatus has a viewer side associated therewith from which a viewer is able to view an image during operation,
in which each of the cells includes a corresponding display part such that the plurality of cells has a plurality of display parts, and the display parts enable a still image, text or pattern to be displayed thereon when the light sources are not actively emitting light, and
in which the transparent state corresponds to an ON-state with light actively emitted from the light sources and the reflective state corresponds to an OFF-state with light not actively emitted from the light sources such that when the cells are in the transparent state emitted light from the plurality of light sources is allowed to pass through the light transmission regions so as to be seen by the viewer from the viewer side, and when the cells are in the reflective state light is not emitted from the plurality of light sources and the still image, text or pattern is caused to be displayed on the display parts of the cells by reflection of ambient light from outside the apparatus so as to be seen by the viewer from the same viewer side.

16. The apparatus of claim 15 further comprising:
a touch sensor arranged on a face of the apparatus.

17. The apparatus of claim 15, wherein the plurality of light sources includes LEDs in an array.

* * * * *